(12) United States Patent
Naamneh et al.

(10) Patent No.: US 11,409,871 B1
(45) Date of Patent: Aug. 9, 2022

(54) UNIVERSAL TRACING OF SIDE-CHANNEL PROCESSES IN COMPUTING ENVIRONMENTS

(71) Applicant: CA, Inc., San Jose, CA (US)

(72) Inventors: Bahaa Naamneh, Oslo (NO); Felix Leder, Tarnasen (NO)

(73) Assignee: CA, Inc., San Jose, CA (US)

(*) Notice: Subject to any disclaimer, the term of this patent is extended or adjusted under 35 U.S.C. 154(b) by 724 days.

(21) Appl. No.: 16/362,009

(22) Filed: Mar. 22, 2019

(51) Int. Cl.
| | |
|---|---|
| *G06F 16/903* | (2019.01) |
| *G06F 21/56* | (2013.01) |
| *G06F 21/31* | (2013.01) |
| *G06F 9/54* | (2006.01) |

(52) U.S. Cl.
CPC .......... *G06F 21/566* (2013.01); *G06F 9/545* (2013.01); *G06F 9/547* (2013.01); *G06F 16/903* (2019.01); *G06F 21/316* (2013.01)

(58) Field of Classification Search
CPC ...... G06F 21/566; G06F 16/903; G06F 9/545; G06F 9/547; G06F 21/316
USPC .......................................................... 726/22
See application file for complete search history.

(56) References Cited

U.S. PATENT DOCUMENTS

| | | | | |
|---|---|---|---|---|
| 6,728,788 B1* | 4/2004 | Ainsworth | ............... | G06F 9/547 719/330 |
| 8,136,155 B2* | 3/2012 | Freund | ..................... | G06F 21/53 726/22 |
| 9,495,210 B1* | 11/2016 | McCann | ................. | G06F 13/10 |
| 9,778,856 B2* | 10/2017 | Fan | ........................... | G06F 3/064 |
| 10,609,075 B2* | 3/2020 | Rozenshein | ........ | H04L 63/1408 |
| 11,150,925 B2* | 10/2021 | Saxena | .................... | G06F 9/545 |
| 2003/0069848 A1* | 4/2003 | Larson | .................... | H04L 41/22 705/50 |
| 2003/0233544 A1* | 12/2003 | Erlingsson | .......... | G06F 21/6218 713/167 |
| 2004/0230636 A1* | 11/2004 | Masuoka | ................ | G06F 9/451 708/800 |
| 2006/0242270 A1* | 10/2006 | Sankaranarayan | ... | G06F 9/4411 709/220 |
| 2006/0253859 A1* | 11/2006 | Dai | ......................... | G06F 9/545 719/321 |
| 2007/0283192 A1* | 12/2007 | Shevchenko | ......... | G06F 21/566 714/39 |

(Continued)

FOREIGN PATENT DOCUMENTS

CN 102438023 B * 8/2014 ............. G06F 9/547

OTHER PUBLICATIONS

RpcView—A free and powerful tool to explore and decompile all RPC functionalities present on Microsoft system, http://www.rpcview.org/. Accessed May 1, 2019.

*Primary Examiner* — Farid Homayounmehr
*Assistant Examiner* — Thanh T Le
(74) *Attorney, Agent, or Firm* — Adsero IP

(57) ABSTRACT

A method for identifying suspicious activity on a monitored computing device is described. In one embodiment, the method may include monitoring a local procedure call interface of the monitored computing device, identifying, based at least in part on the monitoring, a remote procedure call (RPC) of a suspicious process, the RPC being transmitted over a local procedure call message of the local procedure call interface, analyzing the RPC of the suspicious process, and performing a security action based at least in part on the analyzing.

17 Claims, 7 Drawing Sheets

(56) References Cited

U.S. PATENT DOCUMENTS

| | | | |
|---|---|---|---|
| 2009/0109995 A1* | 4/2009 | Alam | H04W 28/065 370/463 |
| 2011/0078798 A1* | 3/2011 | Chen | H04L 63/1433 719/330 |
| 2011/0258208 A1* | 10/2011 | Plotnik | G06F 7/00 707/756 |
| 2018/0052720 A1* | 2/2018 | Ionescu | G06F 9/542 |
| 2018/0054456 A1* | 2/2018 | Ground | H04L 63/1433 |
| 2018/0077196 A1* | 3/2018 | Itikarlapalli | H04L 63/1441 |
| 2019/0149399 A1* | 5/2019 | Reed | H04L 41/082 709/223 |
| 2019/0332376 A1* | 10/2019 | Borra | G06F 11/3442 |

* cited by examiner

UNIVERSAL TRACING OF SIDE-CHANNEL PROCESSES IN COMPUTING ENVIRONMENTS

BACKGROUND

Malicious processes often rely on operating systems to perform malicious actions. Certain associated malware actions may thus be conducted by a known program or service (e.g., known by the operating system), which may be whitelisted and/or excluded from security monitoring. Accordingly, a system for monitoring processes conducted by a known program, service, or operating system may be desirable to identify malicious activities that may otherwise be identified.

SUMMARY

According to at least one embodiment, a method for identifying suspicious activity on a monitored computing device is described. In one embodiment, the method may include monitoring a local procedure call interface of the monitored computing device, identifying, based at least in part on the monitoring, a remote procedure call (RPC) of a suspicious process, the RPC being transmitted over a local procedure call message of the local procedure call interface, analyzing the RPC of the suspicious process, and performing a security action based at least in part on the analyzing.

In some examples, the method may include identifying interface information in a code component associated with the RPC based at least in part on identifying the RPC and constructing a protocol dissector in real-time based at least in part on the interface information. In some examples, identifying the interface information is based at least in part on querying a memory associated with the monitored computing device and identifying data in the memory associated with the RPC. In some examples, the method may include analyzing, in conjunction with the protocol dissector, the RPC and identifying a data field of the RPC based at least in part on the analyzing. In some examples, the method may include using the interface information to decode data from the data field. In some cases, the interface information includes information regarding a serialization format. In some cases, decoding the data includes using the information regarding the serialization format to deserialize the data from the data field.

In some examples, decoding the data may include identifying a custom encoding associated with the RPC and using a custom decoder to decode the data from the data field. In some examples, the code component may include one or more code components, the one or more code components including at least one of a system library or an executable, or at least one system library and at least one executable. In some examples, at least one of the one or more code components is loaded or initiated by the suspicious process or by an extension of an operating system of the monitored computing device that is launched by the suspicious process, or at least one of the one or more code components is loaded or initiated by the suspicious process and at least one of the one or more code components is loaded or initiated by the extension launched by the suspicious process.

In some examples, performing the security action may include preventing the suspicious process from performing an action on the operating system, logging activity of the suspicious process, alerting an administrator to potential suspicious activity, quarantining the suspicious process, blocking the suspicious process, transmit a notification to a remote computing device, preventing the execution of a function of the suspicious process, monitoring one or more additional suspicious processes associated with the RPC, adding the suspicious processes to a list of suspicious processes, or any combination thereof. In some examples, the RPC includes a Local RPC (LRPC) that is associated with at least one of a Background Intelligent Transfer Service (BITS), a Distributed Component Object Model (DCOM), a task scheduler, Windows Management Instrumentation (WMI), a User Mode Driver Framework (UMDF), or any combination thereof.

In some examples, the local procedure call interface operates in a kernel space associated with at least one processor of the monitored computing device. In some cases, the local procedure call interface includes an advanced local procedure call (ALPC) interface. In some examples, the RPC is initiated in the kernel space or a user space associated with an operating system of the monitored computing device. In some cases, the user space includes software applications of the monitored computing device, file systems of the monitored computing device, user accessible operations of the monitored computing device, and user accessible interfaces of the operating system of the monitored computing device. In some cases, the kernel space includes user inaccessible operations of the at least one processor in the monitored computing device, user inaccessible operations of a memory in the monitored computing device, and user inaccessible operations of a storage device in the monitored computing device.

A computing device configured for identifying suspicious activity on a monitored computing device is also described. The computing device may include one or more processors and memory in electronic communication with the one or more processors. The memory may store computer executable instructions that when executed by the one or more processors cause the one or more processors to perform the steps of monitoring a local procedure call interface of the monitored computing device, identifying, based at least in part on the monitoring, a remote procedure call (RPC) of a suspicious process, the RPC being transmitted over a local procedure call message of the local procedure call interface, analyzing the RPC of the suspicious process, and performing a security action based at least in part on the analyzing.

A computer-program product for identifying suspicious activity on a monitored computing device is also described. The computer-program product may include a non-transitory computer-readable medium storing instructions thereon. When the instructions are executed by one or more processors, the execution of the instructions may cause the one or more processors to perform the steps of monitoring a local procedure call interface of the monitored computing device, identifying, based at least in part on the monitoring, a remote procedure call (RPC) of a suspicious process, the RPC being transmitted over a local procedure call message of the local procedure call interface, analyzing the RPC of the suspicious process, and performing a security action based at least in part on the analyzing.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
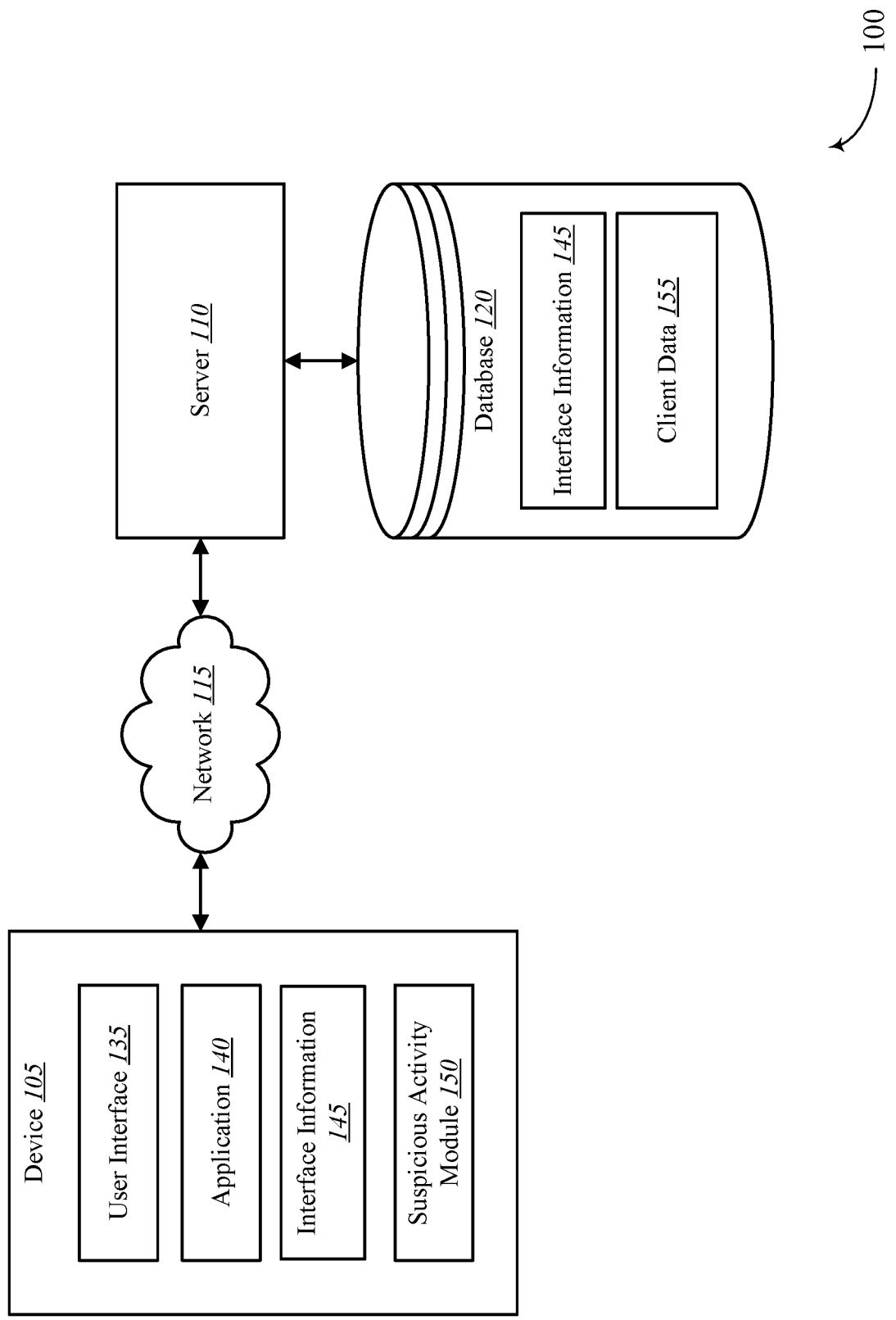
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to identifying suspicious activity on a monitored computing device. More specifically, the systems and methods described herein relate to identifying suspicious activity on a monitored computing device adaptively monitoring remote procedure calls (RPCs) at a local procedure call (e.g., an advanced local procedure call (ALPC) interface).

Modern malware often relies on operating system services to conduct malicious actions. Instead of downloading, executing, or calling system functions, malware may delegate these tasks to the operating system. For example, malware may delegate tasks to services such as Background Intelligent Transfer Service (BITS), Windows Management Instrumentation (WMI), task scheduler, etc. The associated malware action may thus be conducted by a known program or service (e.g., known by the operating system), which may be whitelisted and/or excluded from security monitoring.

In some examples, modern operating systems (e.g., WINDOWS® operating systems, LINUX® operating systems, APPLE® operating systems) may provide a multitude of services available for malware actions. Accordingly, it may be difficult to monitor all variants of invocations and/or task delegations. Additionally, the interfaces of such services may be known or determined (e.g., known to or determined by a monitoring service) and dissectors (e.g., decoders) may be created in order to monitor the potential malware actions. For example, each of WMI, BITS, and the task scheduler may be accessed using a different application program interface (API) and thus may include different parameters to be monitored.

An approach to centrally monitor such services (e.g., WMI, BITS, the task scheduler, etc.) and automatically construct dissectors independent of an operating system's version and/or interface is described herein. The approach may monitor one or more services associated with services or extensions of an operating system (e.g., WMI, BITS, the task scheduler, etc.). Additionally or alternatively the present techniques may monitor one or more third party services (e.g., services associated with a software application installed or running on a monitored computing device, a service of an external computing device, remote to the monitored computing device, such as a server, etc.). Internally, one or more of the monitored services may use one central service or interface of an operating system (e.g., a central interface that interfaces between a user interface of an operating system and the system processes or system extensions of the operating system such as the Advanced Local Procedure Call (ALPC) interface, etc.). For example, monitoring system calls associated with the ALPC interface may provide access to every invocation of the one or more monitored services of an operating system.

In some examples, at least a portion of the monitoring of the ALPC interface may occur in the kernel space of an associated operating system. In some cases, static dissectors may be created based on interface descriptions that are present in or associated with the in-memory executables and libraries of the monitored operating system (e.g., executable files (EXEs), dynamic link libraries (DLLs), etc.). In some cases, a dissector may be created on-the-fly (e.g., in real-time at the time a process or system service is being detected, monitored, analyzed, etc.), which may ensure that the dissector remains current (e.g., up-to-date, usable, error-free, etc.) and compatible with the latest version of operating system and associated interface(s), services, extensions, etc., regardless of updates to the operating system and associated processes, services, extensions, etc. Additionally, the present techniques may avoid having to transmit interface descriptions to the monitored computing device or locally store interface descriptions at the monitored computing device.

In the examples described herein, calls to system services may be associated with procedure calls (e.g., Remote Procedure Calls (RPCs), Local Remote Procedure Calls (LRPCs), etc.). Some examples calls to system services using RPCs and/or LRPCs may include WMI, BITS, task scheduler, etc. LRPC calls may describe the function invocation in, for example, an operating system service and may include identifiable information and/or parameters associated with the system service or a function, or both. In some cases, the identifiable information may include a number associated with the system service (e.g., operation number, OpNum, procedure number, ProcNum, PNO, etc.). In one example, the identifiable information may include an index and/or values in the index within a functions table associated with the functions implemented by the system service, or by an extension of the operating system, or by a function associated with the system service, or by a function invoked by the system service, or by a function that invokes the system service, or any combination thereof.

In some examples, LRPC calls may be transmitted using ALPC messages (e.g., port connection request, request response, message authentication information, message identifier, port identifier, etc.). By monitoring the system calls responsible for ALPC transfers, it may be possible to view and intercept each LRPC message. Accordingly, in some cases a predetermined number of system calls (e.g., preselected system calls) may be monitored, which may lead to a lightweight and powerful approach to identify malicious activities in real-time. In some cases, the tracing described herein may monitor communications such as User Mode Driver Framework (UMDF).

As described herein, monitoring for malicious activities may occur at a relatively low and/or lowest level in the kernel space at which ALPC communication is transmitted from the client (e.g., the actor process/function invocator) to the LRPC service. This may be true for both inbound communications or outbound communications, or both. Even though at least a portion of the monitoring may occur in the kernel space, the monitoring may occur in the context of the client process (e.g., in the context of the function invocator). Monitoring (in the kernel) in the context of the client process may allow for the ability to intercept malicious actions at a central system service hub and restrict the monitoring to a limited number of selected processes (e.g., one or more suspicious programs). Additionally, such monitoring may provide the full context of an ALPC connection/lifespan, even for asynchronous calls.

In some cases, an LRPC call, including its parameters, may be described using a serialization format (e.g., custom serialization format). In one example, the serialization format may include or may be based at least in part on the Network Data Representation (NDR/NDR64) transfer syntax. Additionally or alternatively, some LRPC services such as Distributed Component Object Model (DCOM) and WMI may use additional sets of custom encodings for associated objects such as system calls, processes, services, extensions, etc. The systems and methods described herein may unfold the layers of system calls to the point that the present techniques may capture and decode arbitrary LRPC calls with their parameters and dissect associated protocols for analysis in real-time.

In some cases, the present techniques may include automatically extracting LRPC interface definitions from code components. Examples of code component may include a system library (e.g., dynamic link library (DLL), etc.), an executable process, an executable service, an executable software application, executable program, a service or extension of an operating system (e.g., BITS, WMI, task scheduler, etc.), a service or extension associated with a process running on the monitored computing device, or any combination thereof. In some cases, the definitions may be extracted by tracing, following, and/or cross-referencing internal identifiers and structures in memory that are associated with the LRPC calls or LRPC interface(s). Such information may be available in the context of the function invocator (e.g., a suspect program that initiates the system calls, etc.). As a result, the present techniques may intercept ALPC calls and their marshalled/encoded parameters to perform further analysis. In some cases, the present techniques may extract interface definitions or use previously extracted interface definitions (e.g., NDR format strings, etc.) to analyze the suspect program and associated system calls. In some cases, the system may analyze encoded data from the analyzed system calls based on the interface definitions (e.g., overlay serialized data over the NDR format strings) to deserialize the parameters). In some cases, the present techniques may further decode the parameters using custom decoders when the corresponding interface (e.g., WMI) uses custom encoding.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, and a network 115 that allows the device 105, the server 110, and the database 120 to communicate with one another. In other examples, the environment 100 may include a remote device (e.g., a remote computing device) in communication with device 105.

Examples of the device 105 may include any combination of mobile devices, smart phones, personal computing devices, computers, laptops, desktops, servers, media content set top boxes, or any combination thereof. In some cases, device 105 may include a suspicious activity module 150 integrated within device 105, or may be in communication with a suspicious activity module via network 115. In some examples, device 105 may be in communication with a remote device (e.g., a remote computing device).

Examples of a remote device (e.g., a remote computing device) may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof. In some examples, a remote computing device may connect to device 105 via network 115. In other examples, a remote computing device may connect directly to device 105. In some cases, device 105 may connect or attach to a remote computing device and/or server 110 via a wired and/or wireless connection. In some cases, device 105 may attach to any combination of a port, socket, and slot of device 105 and/or server 110.

In some configurations, the device 105 may include a user interface 135, application 140, interface information 145, and suspicious activity module 150. Although the components of the device 105 are depicted as being internal to the device 105, it is understood that one or more of the components may be external to the device 105 and connect to device 105 through wired and/or wireless connections. In some embodiments, application 140 may be installed on a computing device (e.g., a remote computing device) in order to allow a user to interface with a function of device 105, interface information 145, suspicious activity module 150, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include suspicious activity module 150. For example, device 105 may include application 140 that allows device 105 to interface with a separate device via suspicious activity module 150 located on another device such as a remote computing device and/or server 110. In some embodiments, device 105, remote computing device, and server 110 may include suspicious activity module 150 where at least a portion of the functions of suspicious activity module 150 are performed separately and/or concurrently on device 105, a remote computing device, and/or server 110. Likewise, in some embodiments, a user may access the functions of device 105 (directly or through device 105 via user interface 135) from a remote computing device. For example, in some embodiments, a remote computing device may include a mobile application that interfaces with one or more functions of device 105, suspicious activity module 150, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly a remote computing device and/or one or more network devices such as a gateway, switch, router, intrusion detection system, etc. Database 120 may include interface information 145 and client data 155 (e.g., data associated with device 105, telemetry data associated with device 105 and one or more other monitored client devices, zero-time telemetry data, whitelists, blacklists, malware definitions, etc.). In some examples, interface information 145 may be located at device 105, at database 120, or at both locations and may be utilized in performing adaptive procedure call monitoring (e.g., ALPC monitoring) as described herein. As one example, device 105 (e.g., suspicious activity module 150) may determine whether interface information 145 is stored at database 120 over network 115 via server 110.

As described above, the suspicious activity module 150 may enable identifying suspicious activity on a monitored computing device (e.g., device 105). In some embodiments, suspicious activity module 150 may be configured to perform the methods described herein (e.g., monitor system calls, analyze system calls, perform security actions based on the analysis, etc.) in conjunction with user interface 135 and application 140. User interface 135 may enable a user to interact with, control, and/or program one or more functions of the suspicious activity module 150. Further details regarding the suspicious activity module 150 are discussed below.

Figure 2:
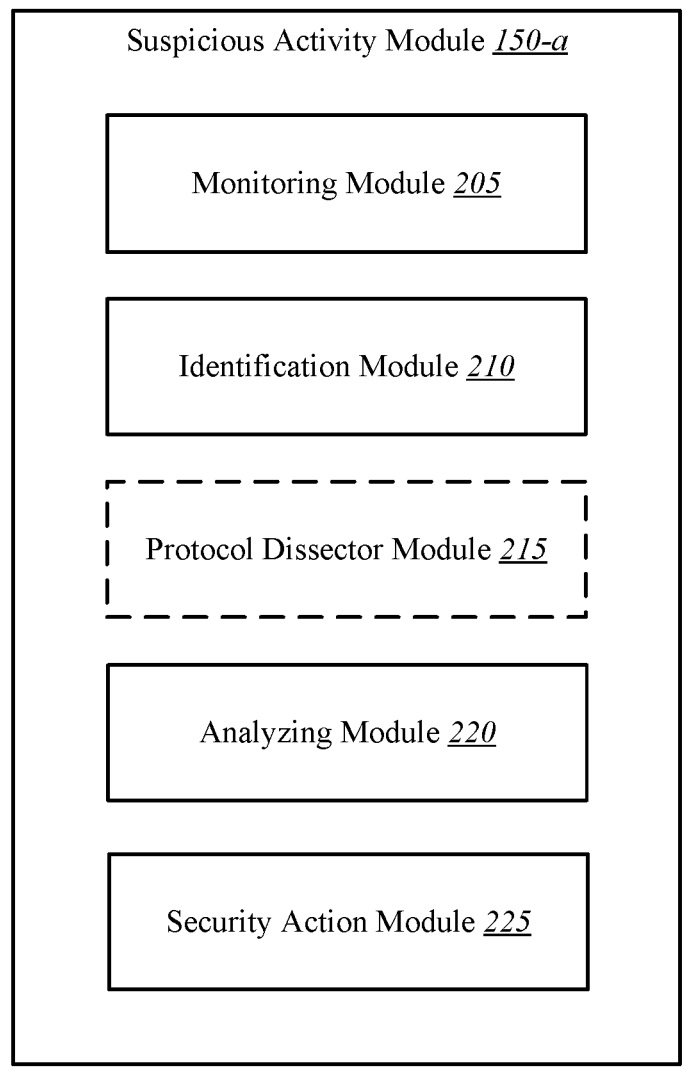
FIG. 2 is a block diagram illustrating one example of a suspicious activity module.

FIG. 2 is a block diagram illustrating one example of a suspicious activity module 150-a. The suspicious activity module 150-a may be one example of a suspicious activity module 150 depicted in FIG. 1. As depicted, suspicious activity module 150-a may include monitoring module 205, identification module 210, analyzing module 220, and security action module 225. In some examples, the suspicious activity module 150-a may include a protocol dissector module 215.

The monitoring module 205 may monitor an advanced local procedure call (ALPC) interface of the monitored computing device (e.g., of device 105 as described with reference to FIG. 1). In some examples, a monitored device may include an operating system with multiple interfaces or spaces that provide the context in which different operations may occur. For example, an operating system may include at least a user space and a kernel space. The user space may be or may include the portions of an operating system that a user may interact with. For example, the user space may include software applications of the monitored computing device, file systems of the monitored computing device, user accessible operations of the monitored computing device, and user accessible interfaces of the operating system of the monitored computing device.

The kernel space of an operating system may be or may include operations that occur within a kernel level of the operating system and/or certain hardware. In some cases, a kernel space may be or may include the processing data (e.g., processing of system data by one or more processors). In some examples, the kernel space may include user inaccessible operations of the at least one processor in the monitored computing device, user inaccessible operations of a memory in the monitored computing device, and user inaccessible operations of a storage device in the monitored computing device. In some examples, the kernel space of an operating system may be responsible for input/output requests associated with software (e.g., of applications running in the user space), and may translate input/output requests into data processing instructions for the central processing unit (CPU).

As discussed herein, the monitoring module 205 may monitor an ALPC interface of the monitored computing device. In some examples, the ALPC interface may be at least partially located in and/or operate in conjunction with the kernel space of an operating system. The ALPC interface may be or may be understood as an internal communication service or extension of the operating system. In some examples, the ALPC interface may be configured to communicate via one or more messages, such as ALPC messages. As discussed herein, the ALPC messages may be configured to provide inter-process communications between client/server processes of the monitored device. In some examples, the monitoring module 205 may monitor the ALPC interface in real-time. For example, the ALPC interface may send/receive messages (e.g., ALPC messages) pertaining to different programs, processes, and/or APIs. As the monitoring module 205 monitors the messages, the monitoring module 205 may indicate one or more of the messages to the identification module 210.

In some cases, the identification module 210 may identify a remote procedure call (RPC) of a suspicious process based on the monitoring module 205 monitoring the ALPC interface. In some examples, an RPC may be transmitted over an ALPC message. An RPC may be or may include a protocol that one program may use to request a service (e.g., a suspect program requesting use of a system service). In some cases, an RPC may be agnostic regarding particulars of the operating system. An RPC may be a synchronous operation that includes the associated program being suspended until the results of the remote procedure are returned. When a program that uses RPC framework is compiled into an executable program, a code may be compiled that is representative of the RPC. When the program is run and the procedure call is issued, the compiled code may be forwarded to the ALPC interface (e.g., via an ALPC message). In some examples, the ALPC interface may have the knowledge of how to address the application defined by the code and may execute the code (e.g., implement a function defined by the code). As discussed herein, one or more dissectors may be compiled or generated to decipher the contents of the code (e.g., dissect or parse fields of a message, deserialize data in a parsed field, decode encoded data in a parsed field, etc.).

In one example, the RPC may occur in the context of the user space or the kernel space. In some cases, the ALPC monitoring of the monitoring module 205 may detect RPCs occurring in the user space or the kernel space. In some examples, the RPC of the suspicious process may occur in the context of the kernel space of the operating system, but may be operating in the context of the user space. Thus, the RPC may be identified in the context of a function executing or called to execute in the user space. Accordingly, an RPC may be identified in the context of a particular client process (e.g., in the context of the function executing or called to execute, etc.). In some cases, monitoring module 205 may restrict monitoring of the RPC to particular preselected processes. For example, RPCs that are associated with particular functions executing or called to execute may be monitored by monitoring module 205 at the ALPC interface. Though in some examples RPC may be initiated in the user space of the operating system, in some examples the RPC may be initiated in the kernel space or a user space associated with an operating system of the monitored computing device.

In some examples, the protocol dissector module 215 may be configured to identify interface information in a code component associated with the RPC and/or construct a protocol dissector based on the interface information. The term protocol dissector, as used herein, may be or may refer to a decoder that is configured to decode one or more portions of a message or protocol (e.g., an RPC identified at the ALPC interface). The interface information associated with an RPC may include one or more executable files and/or a system library. For example, the RPC of a suspicious process may include a Dynamic Link Library (DLL) that includes a library of executable functions or data that can be executed in the kernel space. In some examples, the DLL may include basic information such as an interface identification and/or a method identification. Additionally or alternatively, the interface information associated with the RPC may include a component that may be implemented as a system file or kernel driver (e.g., a .SYS file). In some examples, the system file may invoke one or more file types from the user space. For example, the kernel space may invoke either a DLL or an executable (e.g., an EXE). The system file may invoke an LRPC call that is handled by a service that implement an LRPC interface in the user space, where the LRPC interface in the user space may be associated with a DLL or EXE in the user space. In some cases, a code component may include format strings (e.g., NDR format strings, NDR information, etc.).

The protocol dissector module 215 may be configured to extract interface definitions associated with a system call (e.g., NDR and RPC interface definitions associated with an RPC, etc.). In one example, once the RPC is identified at the ALPC interface, the protocol dissector module 215 may extract the NDR format strings and/or RPC interface information and use the extracted information to construct a protocol dissector. In some examples, the interface information may be identified and/or located by the protocol dissector module 215 based on querying a memory associated with the monitored computing device. In some examples, the memory associated with the monitored computing device may be or may include a main system memory (e.g., of the device), a RPC service memory, a third-party memory or memory associated with a third-party process, and/or a monitored process memory.

Upon identifying the interface information in the code component associated with the RPC, the protocol dissector module 215 may construct a protocol dissector based on the interface information. In some examples, the protocol dissector may be constructed in real-time. As discussed herein, the protocol dissector may be understood as a decoder for understanding the particulars of a given RPC. For example, when an RPC raises suspicion the identification module 210 may identify the particular RPC and, upon the protocol dissector module 215 constructing the protocol dissector, the particular fields of the RPC may be read. Based on the contents of the fields of the RPC (e.g., whether the contents identify a suspicious action), a security action may be performed (e.g., the contents may be logged, etc.). In some examples, the logged contents of the RPC may be used in subsequent determinations of a suspicious activity.

In some examples, the protocol dissector module 215 may analyze the RPC and identify a particular data field (e.g., using the protocol dissector). By using the interface information to construct the protocol dissector, the protocol dissector may be used to decipher fields in a message associated with a system call (e.g., an RPC). In some examples, the interface information may include a serialization format (e.g., NDR serializing format) that may be used in deserializing/decoding data in a dissected field. The serialization format may be used to deserialize the data from the data field, which may trigger a security action. In one example, the serialization format may be used to deserialize the data of a dissected data field, which may indicate that at least one of the one or more code components is loaded or initiated by the suspicious process or by an extension of an operating system of the monitored computing device that is launched by the suspicious process. In other examples, the one or more code components may indicate that at least one of the one or more code components is loaded or initiated by the suspicious process and at least one of the one or more code components is loaded or initiated by an extension launched by the suspicious process.

The analyzing module 220 may analyze processes, extensions, code components, deserialized/decoded data, and the like that is associated with the suspicious process to determine whether a security action should be performed. For example, analyzing the data associated with a suspicious process may include determining whether the deserialized data matches one or more malware signatures, determining whether a threat score associated with the analyzed data satisfies a threat threshold, and/or determining whether the analyzed data satisfies a suspicious behavior threshold. In other examples, analyzing the data associated with the suspicious process may include determining whether the identity information of a user has been potentially stolen. Thus, the analyzing module 220 may perform one or more operations to compare the analyzed data associated with the RPC against one or more known malicious activities, known patterns, and/or against data associated with a known malicious activity. When the analysis indicated potential malware, a security action may be performed.

In some cases, security action module 225 may perform a security action based on analyzing processes, system calls and data associated with the suspicious process. In some examples, the security action may include preventing the suspicious process from performing an action on the operating system, logging activity of the suspicious process, alerting an administrator to potential suspicious activity, quarantining the suspicious process, blocking the suspicious process, transmit a notification to a remote computing device, preventing the execution of a function of the suspicious process, monitoring one or more additional processes associated with the suspicious process, adding the suspicious processes to a list of known malware, or any combination thereof. Thus, the security action may be triggered in order to prevent or mitigate the harm associated with the suspicious process (e.g., of the malicious activity).

Figure 3:
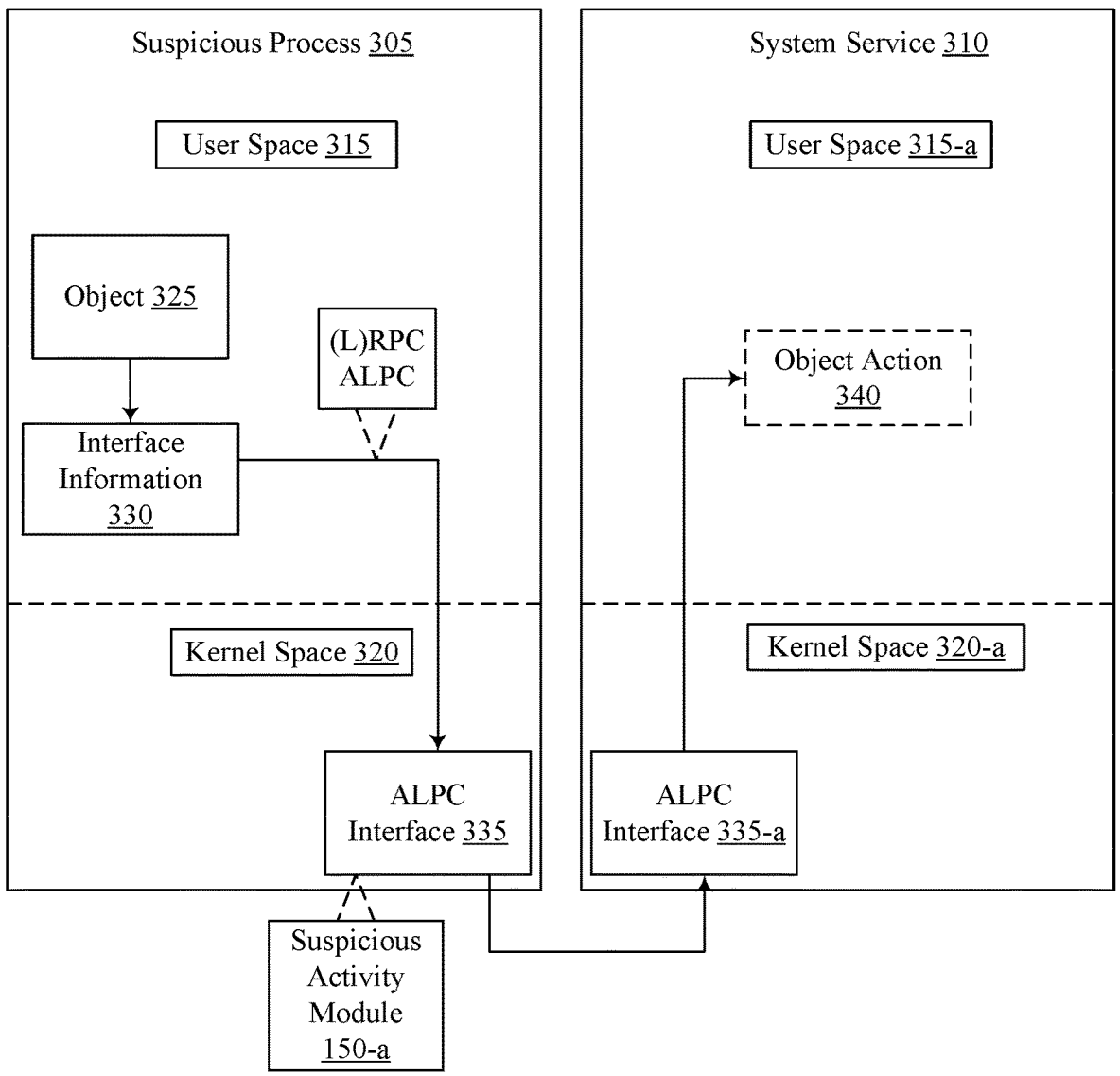
FIG. 3 is a system diagram illustrating one example of universal tracing of side-channel processes in computing environments.

FIG. 3 is a system diagram illustrating a system 300 that supports universal tracing of side-channel processes in computing environments as described herein. In some embodiments, the systems 300 may include a suspicious process 305 and associated system services (e.g., system service 310) that may operate in conjunction with an operating system. Each of the suspicious process 305 and the system service may include operations that occur in the context of a user space 315 or a kernel space 320 of the operating system, or both. In some examples the user space 315 associated with the suspicious process 305 may include an object 325 (e.g., a process, program, application, executable, DLL, etc.) and interface information 330, and the user space 315-a associated with the system service 310 may include an object action 340. The kernel space 320 associated with the suspicious process 305 may include an ALPC interface 335, which may include a suspicious activity module 150-*a*, which may be an example of the suspicious activity module 150 as described with reference to FIGS. 1 and 2. In some examples, the kernel space 320-*a* associated with the system service 310 may include an ALPC interface 335-*a*.

In some examples, a suspicious process may be associated with an object 325 located in the user space 315 of an operating system. The object 325 may include or may be associated with applications, executable files, and other software that a user may interact with. For example, the object 325 may be associated with a system service (e.g., BITS), and the suspicious activity associated with the object 325 may include the system service downloading and/or installing a particular file on the operating system (e.g., object action 340). In order for the object 325 to perform the object action 340, the object 325 may initiate an RPC in the kernel space 320. More specifically, the object 325 may transmit an RPC-using an ALPC message-via the ALPC interface 335.

As described herein, the ALPC interface 335 may operate in the kernel space 320 of an operating system and may include a suspicious activity module 150-*a*. As described with reference to FIG. 2, the suspicious activity module 150-*a* may be configured to monitor the ALPC interface 335, identify an RPC of a suspicious process, analyze the RPC of the suspicious process, and perform a security action based on the analyzing. Thus, the suspicious activity module 150-*a* may prevent the object action 340 from occurring in the instance that it is determined to be associated with a malicious activity.

In some examples, the suspicious activity module 150-*a* of the ALPC interface 335 may be configured to identify interface information 330 that is associated with the object 325. For example, the object 325 (e.g., a system service such as BITS) may be associated with the interface information 330 (e.g., "BitsProxy.dll"). In some examples, the interface information 330 may include a library of executable functions or data that can be executed in the kernel space that is associated with the object 325. For example the interface information 330 may instruct a processor of the kernel space to execute the object action 340 (e.g., to add the file using BITS).

Because the suspicious activity module 150-*a* may use the interface information 330 associated with the object 325, the suspicious activity module 150-*a* may identify both the object 325 and the interface information 330. In some cases, upon receiving the interface information, the suspicious activity module 150-*a* may construct a protocol dissector in order to decipher data associated with the RPC (e.g., dissect/ decode fields of a message, etc.). As described herein, data associated with the RPC may be decoded in order to decipher information associated with the suspicious process. Based on analysis of the deciphered information, a security action may be performed by the suspicious activity module 150-*a*. Thus, in some examples, the object action 340 (e.g., operations of a system service such as BITS) may be blocked or prevented based on the security action.

Figure 4:
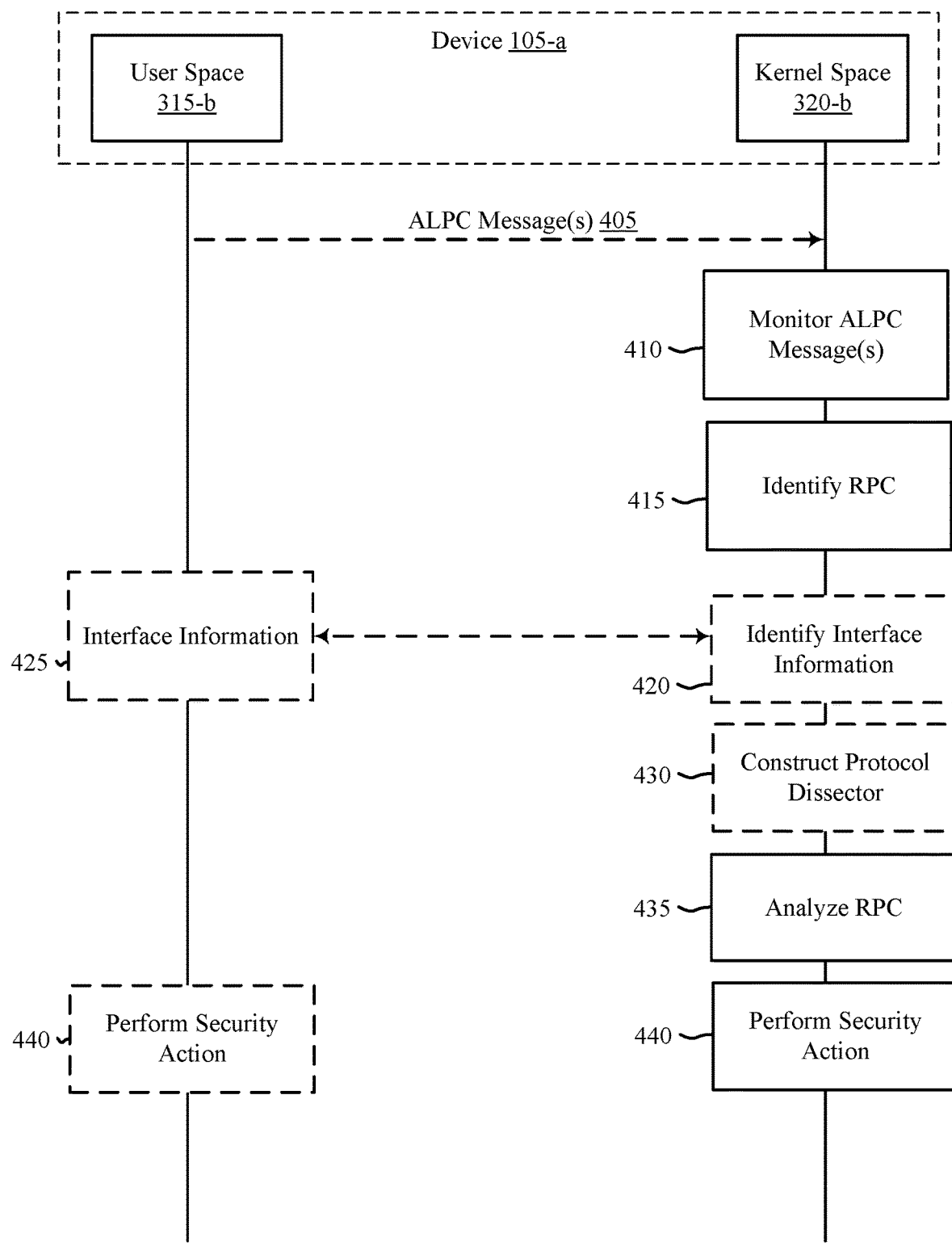
FIG. 4 is a swim diagram that supports universal tracing of side-channel processes in computing environments.

FIG. 4 is a swim diagram 400 that supports universal tracing of side-channel processes in computing environments as described herein. In some examples, swim diagram 400 may implement aspects of environment 100 and/or system 300. In some configurations, the diagram 400 may be associated with a device 105-*a* that includes a user space 315-*b* and a kernel space 320-*b*. In some examples, device 105-*a* may be an example of device 105 as described with respect to FIG. 1, and user space 315-*b* may be an example of user space 315 or user space 315-*a* as described with reference to FIG. 3, and kernel space 320-*b* may be an example of kernel space 320 or kernel space 320-*a* as described with reference to FIG. 3. In some configurations, the steps depicted by the swim diagram 400 may be implemented in conjunction with server 110, network 115, components thereof, or any combination thereof. In some cases, aspects of diagram 400 may be implemented by and/or in conjunction with suspicious activity module 150. In some examples, device 105-*a* may be referred to as a user device and may be associated with a user seeking to identify a suspicious activity on a monitored device.

At 405, one or more ALPC messages may be initiated in the kernel space 320-*b* of the device. The ALPC messages may be continually transmitted and, in some examples, may be associated with an RPC. The RPC, in some examples, may include a Local RPC (LRPC) that is associated with at least one system service or extension of an operating system (e.g., Background Intelligent Transfer Service (BITS), a Distributed Component Object Model (DCOM), a task scheduler, Windows Management Instrumentation (WMI), a User Mode Driver Framework (UMDF), etc.).

In some examples, the ALPC message(s) may be transmitted in the context of the client process (e.g., in the context of the function invocator). Thus, the ALPC message(s) transmitted at 405 may be received at the kernel space 320-*b* (e.g., at the ALPC interface) but may be in the context of the user space 315-*b*. Monitoring (in the kernel) in the context of the client process may allow for the ability to intercept malicious actions at a central hub and restrict the monitoring to a limited number of interesting processes (e.g., a single suspicious program).

At block 410, an ALPC interface of the device 105-*a* may be monitored. In some examples, the ALPC interface may be located in the kernel space 320-*b*. The ALPC interface may continually process ALPC messages (e.g., as at 405), and in some cases an ALPC message may be associated with one or more RPCs of a suspicious process. In some examples, the ALPC messages may be configured to communicate with the processor of the device, and the ALPC interface may be monitored in real-time.

At block 415, an RPC of a suspicious process may be identified. In some examples, the identified RPC of the suspicious process may be received in the kernel space 320-*b* of the operating system, but may be operating in the context of the user space 315-*b*. Thus, the RPC may be identified in the context of the function to be executed in the user space 315-*b*. Accordingly, an RPC may be identified in the context of the particular client process (e.g., in the context of the function being executed or called to execute).

At block 420, interface information in a code component associated with the RPC may be identified. The code component associated with the RPC may be loaded or initiated by the suspicious process or by an extension of the operating system that is launched by the suspicious process. As discussed herein, the interface information associated with the RPC may include one or more executable files and/or system libraries (e.g., stored in the user space 315-*b* at block 425). In some examples, the interface information from 425 may be stored at a memory associated with the device 105-*a*. Accordingly, identifying the interface information (e.g., block 420) may be based on querying the memory associated with the device 105-*a* and identifying data in the memory associated with the RPC.

At block 430, a protocol dissector may be constructed based on the interface information. In some examples, the protocol dissector may be constructed in real-time. As discussed herein, the protocol dissector may be understood as a decoder for dissecting or parsing data fields of a protocol message, (e.g., an RPC, etc.). The data field may, in some examples, include particular information associated with the suspicious process that may identify whether the process is malicious. Based on the contents of the fields of the RPC (e.g., whether the contents identify a suspicious action), the contents may be logged. In some examples, the logged contents of the RPC may be used in subsequent determinations of a suspicious activity.

At block 435, the RPC of the suspicious process may be analyzed. In some examples, the RPC of the suspicious process may be analyzed to determine whether a security action should be performed (e.g., at block 440). In some cases, the data associated with the suspicious process may be analyzed in relation to malicious activities. If the data matches—e.g., the analyzed data is determined to be associated with a malicious activity—then a security action may be performed.

At block 440, a security action may be performed based on the analyzing (e.g., at block 435). In some examples, the security action may include preventing the suspicious process from performing an action on the operating system, logging activity of the suspicious process, alerting an administrator to potential suspicious activity, quarantining a suspicious process, blocking the suspicious process, transmit a notification to a remote computing device, preventing the execution of a function of the suspicious process, monitoring one or more additional suspicious processes associated with the RPC, adding the suspicious processes to a list of suspicious processes, or any combination thereof. In some examples, the security action may be performed based on determining the data matches one or more malware signatures in the database, determining the threat risk score satisfies a risk score threshold, determining the threat activities satisfy a threat threshold, determining the suspicious behaviors satisfy a suspicious behaviors threshold, determining the identity information of the user has been potentially stolen, or any combination thereof. Thus, the security action may be triggered in order to prevent or mitigate the harm associated with the suspicious process (e.g., of the malicious activity). As depicted in FIG. 4, the security action may be performed in the user space 315-b of the operating system and/or the kernel space 320-b of the operating system.

Figure 5:
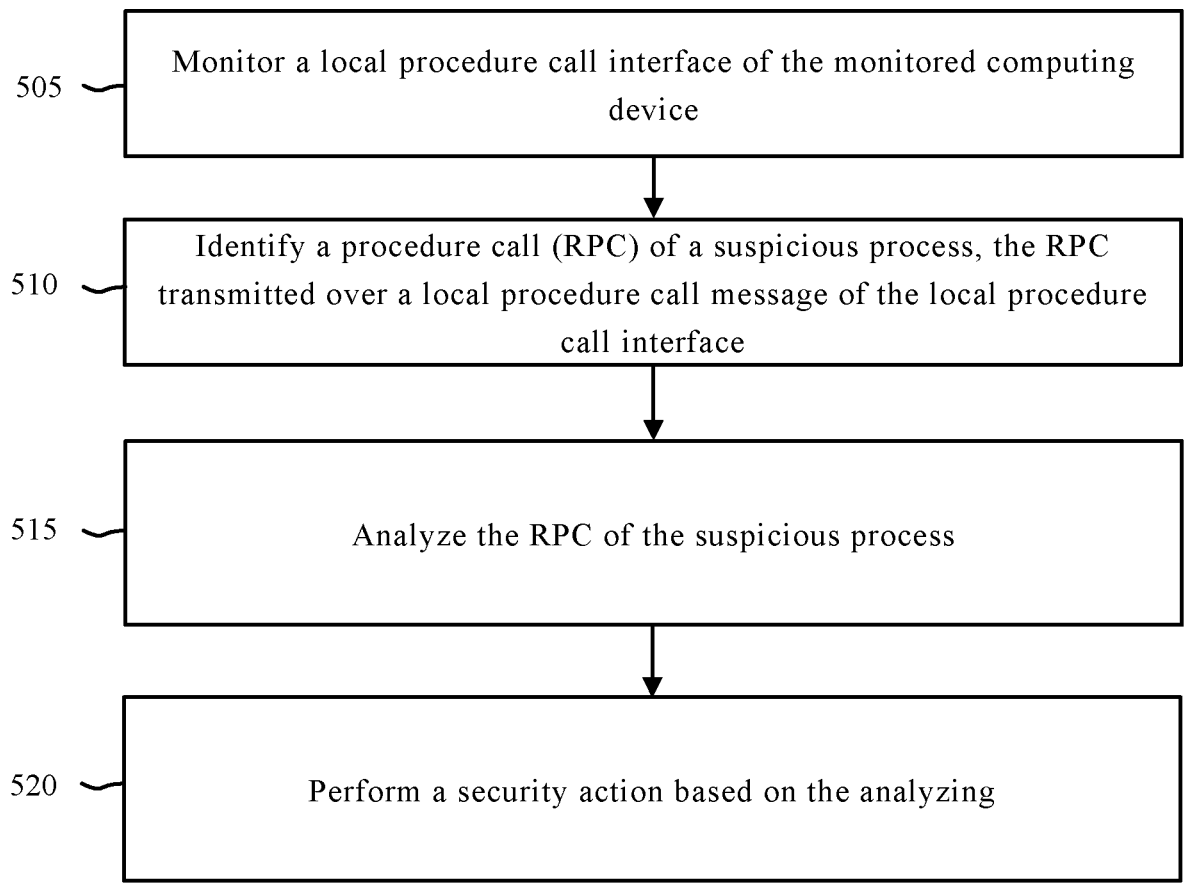
FIG. 5 is a flow diagram illustrating one embodiment of a method in accordance with various aspects of this disclosure.

FIG. 5 is a flow diagram illustrating one embodiment of a method 500 for universal tracing of side-channel processes in computing environments. In some configurations, the method 500 may be implemented by the suspicious activity module 150 illustrated in FIG. 1 or 2. In some configurations, the method 500 may be implemented in conjunction with device 105, server 110, network 115, database 120, components thereof, or any combination thereof.

At block 505, the method 500 may include monitoring a local procedure call interface of the monitored computing device. At block 510, the method 500 may include identifying, based at least in part on the monitoring, a remote procedure call (RPC) of a suspicious process, the RPC being transmitted over a local procedure call message of the local procedure call interface. At block 515, the method 500 may include analyzing the RPC of the suspicious process. At block 520, the method 500 may include performing a security action based at least in part on the analyzing.

Figure 6:
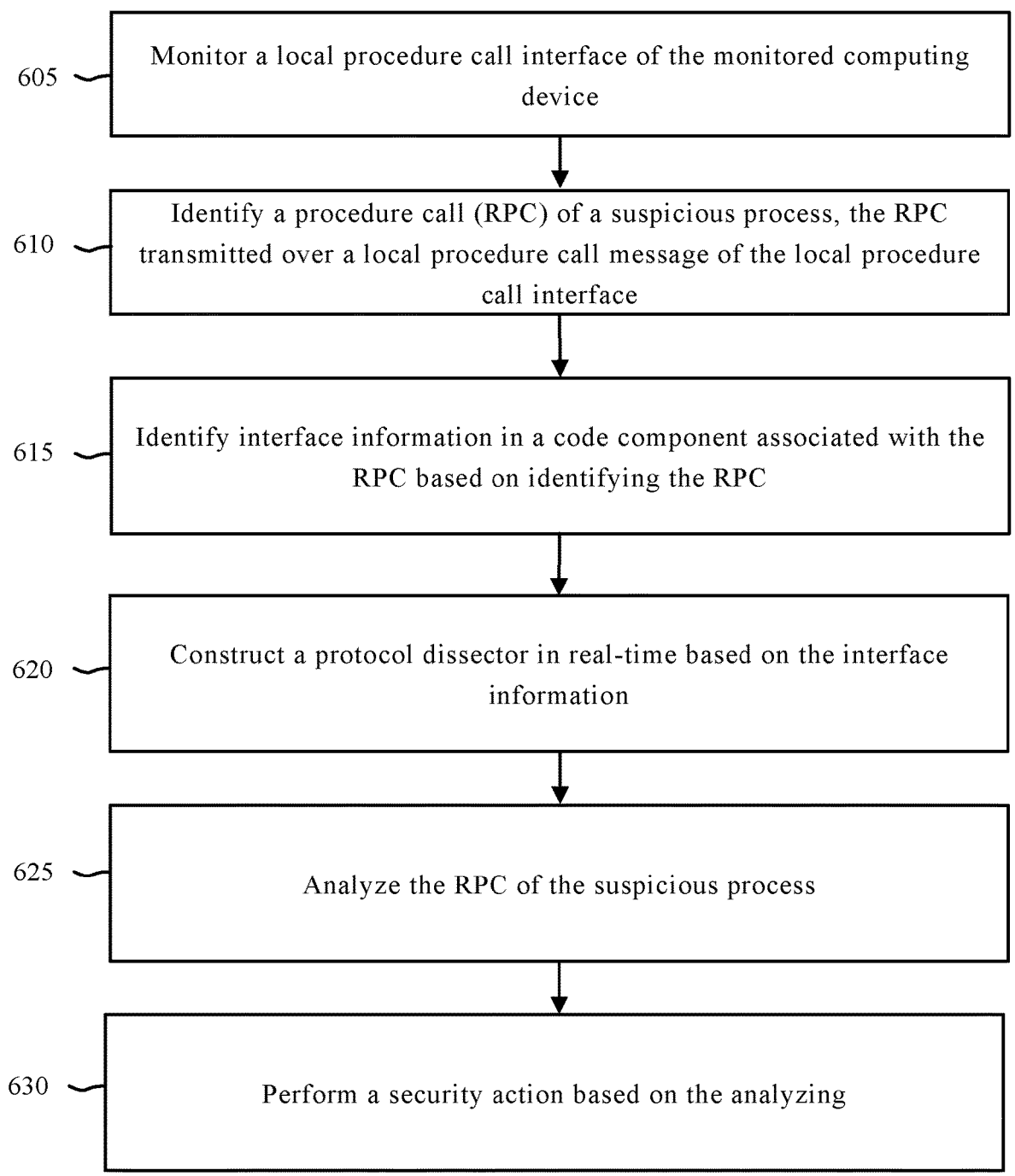
FIG. 6 is a flow diagram illustrating one embodiment of a method in accordance with various aspects of this disclosure.

FIG. 6 is a flow diagram illustrating one embodiment of a method 600 for universal tracing of side-channel processes in computing environments. In some configurations, the method 600 may be implemented by the suspicious activity module 150 illustrated in FIG. 1 or 2. In some configurations, the method 600 may be implemented in conjunction with device 105, server 110, network 115, database 120, components thereof, or any combination thereof.

At block 605, the method 600 may include monitoring a local procedure call interface of the monitored computing device. At block 610, the method 500 may include identifying, based at least in part on the monitoring, a remote procedure call (RPC) of a suspicious process, the RPC being transmitted over a local procedure call message of the local procedure call interface. At block 615, the method 600 may include identifying interface information in a code component associated with the RPC based at least in part on identifying the RPC.

At block 620, the method 600 may include constructing a protocol dissector in real-time based at least in part on the interface information. At block 625, the method 600 may include analyzing the RPC of the suspicious process. At block 630, the method 600 may include performing a security action based at least in part on the analyzing.

In some examples, the method 500 as described with reference to FIG. 5 and/or the method 600 as described with reference to FIG. 6 may include identifying interface information in a code component associated with the RPC based at least in part on identifying the RPC and constructing a protocol dissector in real-time based at least in part on the interface information. In some examples, identifying the interface information is based at least in part on querying a memory associated with the monitored computing device and identifying data in the memory associated with the RPC. In some examples, the method may include analyzing, in conjunction with the protocol dissector, the RPC and identifying a data field of the RPC based at least in part on the analyzing. In some examples, the method may include using the interface information to decode data from the data field. In some cases, the interface information includes information regarding a serialization format. In some cases, decoding the data includes using the information regarding the serialization format to deserialize the data from the data field.

In some examples, the method 500 as described with reference to FIG. 5 and/or the method 600 as described with reference to FIG. 6 may include identifying a custom encoding associated with the RPC and using a custom decoder to decode the data from the data field. In some examples, the code component may include one or more code components, the one or more code components including at least one of a system library or an executable, or at least one system library and at least one executable. In some examples, at least one of the one or more code components is loaded or initiated by the suspicious process or by an extension of an operating system of the monitored computing device that is launched by the suspicious process, or at least one of the one or more code components is loaded or initiated by the suspicious process and at least one of the one or more code components is loaded or initiated by the extension launched by the suspicious process.

In some examples, such as the method 500 as described with reference to FIG. 5 and/or the method 600 as described with reference to FIG. 6, performing the security action may include preventing the suspicious process from performing an action on the operating system, logging activity of the suspicious process, alerting an administrator to potential suspicious activity, quarantining the suspicious process, blocking the suspicious process, transmit a notification to a remote computing device, preventing the execution of a function of the suspicious process, monitoring one or more additional suspicious processes associated with the RPC, adding the suspicious processes to a list of suspicious processes, or any combination thereof. In some examples, the RPC includes a Local RPC (LRPC) that is associated with at least one of a Background Intelligent Transfer Service (BITS), a Distributed Component Object Model (DCOM), a task scheduler, Windows Management Instrumentation (WMI), a User Mode Driver Framework (UMDF), or any combination thereof.

In some examples, the method 500 as described with reference to FIG. 5 and/or the method 600 as described with reference to FIG. 6, the ALPC interface operates in a kernel space associated with at least one processor of the monitored computing device. In some examples, the RPC is initiated in the kernel space or a user space associated with an operating system of the monitored computing device. In some cases, the user space includes software applications of the monitored computing device, file systems of the monitored computing device, user accessible operations of the monitored computing device, and user accessible interfaces of the operating system of the monitored computing device. In some cases, the kernel space includes user inaccessible operations of the at least one processor in the monitored computing device, user inaccessible operations of a memory in the monitored computing device, and user inaccessible operations of a storage device in the monitored computing device.

Figure 7:
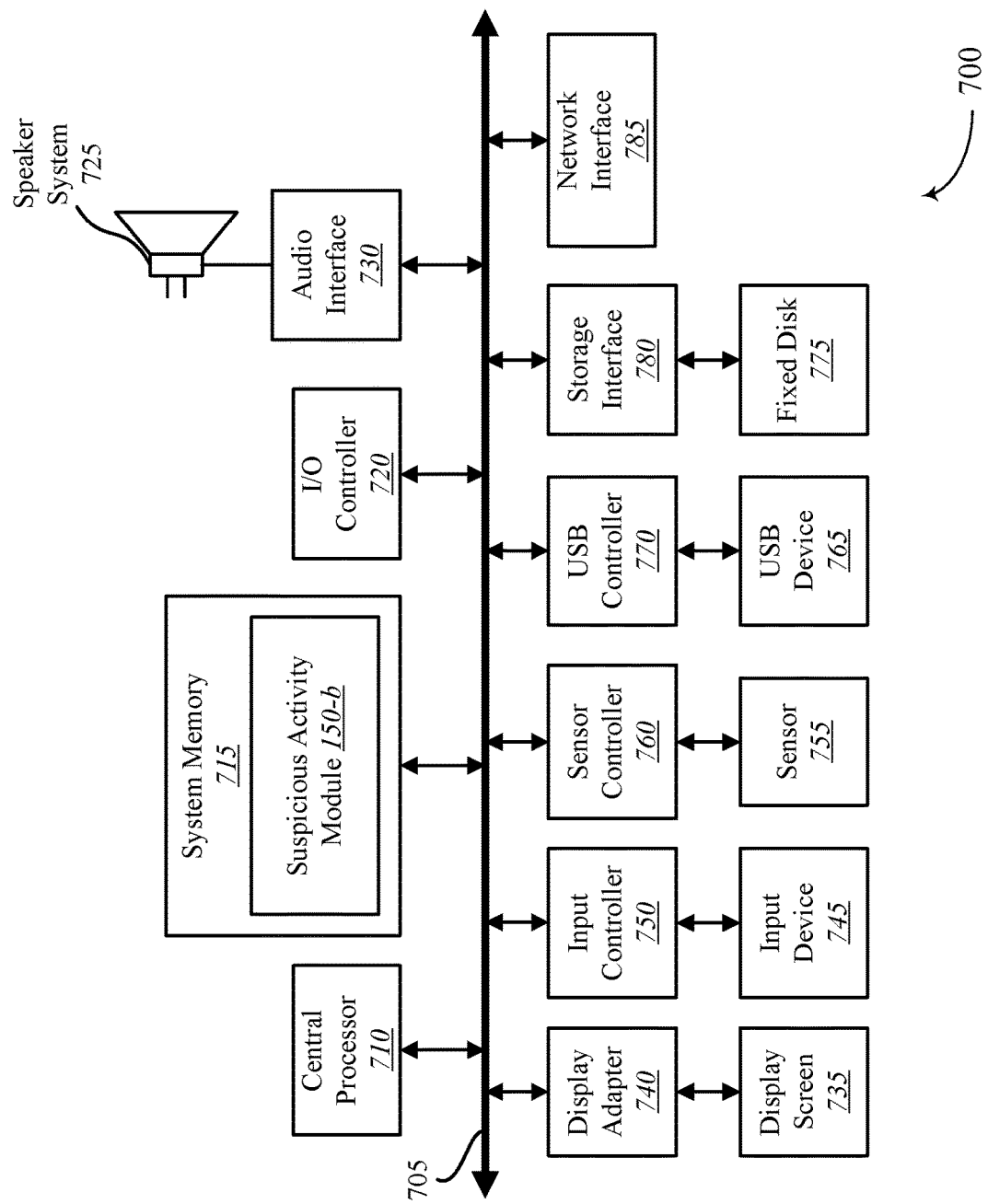
FIG. 7 depicts a block diagram of a computer system suitable for implementing the present systems and methods.

FIG. 7 depicts a block diagram of a computing device 700 suitable for implementing the present systems and methods. The computing device 700 may be an example of device 105 and/or server 110 illustrated in FIG. 1. In one configuration, computing device 700 includes a bus 705 which interconnects major subsystems of computing device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the suspicious activity module 150-b to implement the present systems and methods may be stored within the system memory 715. Applications (e.g., application 140) resident with computing device 700 are generally stored on and accessed via a non-transitory computer readable medium, such as a hard disk drive (e.g., fixed disk drive 775) or other storage medium. Additionally, applications can be in the form of electronic signals modulated in accordance with the application and data communication technology when accessed via network interface 785.

Storage interface 780, as with the other storage interfaces of computing device 700, can connect to a standard computer readable medium for storage and/or retrieval of information, such as a fixed disk drive 775. Fixed disk drive 775 may be a part of computing device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to computing device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk drive 775. The operating system provided on computing device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computing device 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 720 may operate in conjunction with network interface 785 and/or storage interface 780. The network interface 785 may enable computing device 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fibre Channel adapter. Storage interface 780 may enable computing device 700 to access one or more data storage devices. The one or more data storage devices may include two or more data tiers each. The storage interface 780 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for identifying suspicious activity on a monitored computing device, at least a portion of the method being performed by one or more computing devices, each comprising at least one processor, the method comprising:
    monitoring a local procedure call interface of the monitored computing device;
    identifying, based at least in part on the monitoring, a remote procedure call (RPC) of a suspicious process, the RPC being transmitted over a local procedure call message of the local procedure call interface;
    identifying interface information in a code component associated with the RPC based at least in part on identifying the RPC;
    constructing a protocol dissector in real-time based at least in part on the interface information;
    analyzing, in conjunction with the protocol dissector, the RPC of the suspicious process;
    identifying a data field of the RPC based at least in part on the analyzing;
    using the interface information to decode data from the data field, wherein the interface information includes information regarding a serialization format, wherein decoding the data includes using the information regarding the serialization format to deserialize the data from the data field; and
    performing a security action based at least in part on the data from the data field.

2. The method of claim 1, wherein identifying the interface information is based at least in part on querying a memory associated with the monitored computing device and identifying data in the memory associated with the RPC.

3. The method of claim 1, wherein decoding the data further comprises:
    identifying a custom encoding associated with the RPC; and
    using a custom decoder to decode the data from the data field.

4. The method of claim 1, wherein the code component includes one or more code components, the one or more code components including at least one of a system library or an executable, or at least one system library and at least one executable.

5. The method of claim 4, wherein at least one of the one or more code components is loaded or initiated by the suspicious process or by an extension of an operating system of the monitored computing device that is launched by the suspicious process, or at least one of the one or more code components is loaded or initiated by the suspicious process and at least one of the one or more code components is loaded or initiated by the extension launched by the suspicious process.

6. The method of claim 1, wherein performing the security action comprises:
preventing the suspicious process from performing an action on an operating system, logging activity of the suspicious process, alerting an administrator to potential suspicious activity, quarantining the suspicious process, blocking the suspicious process, transmit a notification to a remote computing device, preventing execution of a function of the suspicious process, monitoring one or more additional suspicious processes associated with the RPC, adding the suspicious processes to a list of suspicious processes, or any combination thereof.

7. The method of claim 1, wherein the RPC includes a Local RPC (LRPC) that is associated with at least one of a Background Intelligent Transfer Service (BITS), a Distributed Component Object Model (DCOM), a task scheduler, Windows Management Instrumentation (WMI), a User Mode Driver Framework (UMDF), or any combination thereof.

8. The method of claim 1, wherein the local procedure call interface operates in a kernel space associated with at least one processor of the monitored computing device, and wherein the local procedure call interface includes an advanced local procedure call (ALPC) interface.

9. The method of claim 8, wherein the RPC is initiated in the kernel space or a user space associated with an operating system of the monitored computing device, wherein the user space includes software applications of the monitored computing device, file systems of the monitored computing device, user accessible operations of the monitored computing device, and user accessible interfaces of the operating system of the monitored computing device, and wherein the kernel space includes user inaccessible operations of the at least one processor in the monitored computing device, user inaccessible operations of a memory in the monitored computing device, and user inaccessible operations of a storage device in the monitored computing device.

10. The method of claim 9, further comprising:
performing the security action based at least in part on at least one of determining the data from the data field matches one or more malware signatures in a database, determining a threat risk score satisfies a risk score threshold, determining threat activities satisfy a threat threshold, determining suspicious behaviors satisfy a suspicious behaviors threshold, determining an identity information of a user has been potentially stolen, or any combination thereof.

11. A computing device configured for identifying suspicious activity on a monitored computing device, comprising:
a processor;
memory in electronic communication with the processor, wherein the memory stores computer executable instructions that when executed by the processor cause the processor to perform the steps of:
monitor a local procedure call interface of the monitored computing device;
identify, based at least in part on the monitoring, a remote procedure call (RPC) of a suspicious process, the RPC being transmitted over a local procedure call message of the local procedure call interface;
analyze the RPC of the suspicious process; and
perform a security action based at least in part on the analyzing;
wherein the local procedure call interface operates in a kernel space associated with at least one processor of the monitored computing device, and wherein the local procedure call interface includes an advanced local procedure call (ALPC) interface; and
wherein the RPC is initiated in the kernel space or a user space associated with an operating system of the monitored computing device, wherein the user space includes software applications of the monitored computing device, file systems of the monitored computing device, user accessible operations of the monitored computing device, and user accessible interfaces of the operating system of the monitored computing device, and wherein the kernel space includes user inaccessible operations of the at least one processor in the monitored computing device, user inaccessible operations of a memory in the monitored computing device, and user inaccessible operations of a storage device in the monitored computing device.

12. The computing device of claim 11, wherein the instructions are executable by the processor to:
identify interface information in a code component associated with the RPC based at least in part on identifying the RPC; and
construct a protocol dissector in real-time based at least in part on the interface information.

13. The computing device of claim 12, wherein identifying the interface information is based at least in part on querying the memory associated with the monitored computing device and identifying data in the memory associated with the RPC.

14. The computing device of claim 12, wherein the instructions are executable by the processor to:
analyze, in conjunction with the protocol dissector, the RPC; and
identify a data field of the RPC based at least in part on the analyzing.

15. The computing device of claim 14, wherein the instructions are executable by the processor to:
use the interface information to decode data from the data field, wherein the interface information includes information regarding a serialization format, wherein decoding the data includes using the information regarding the serialization format to deserialize the data from the data field.

16. The computing device of claim 15, wherein decoding the data further comprises:
identifying a custom encoding associated with the RPC; and
using a custom decoder to decode the data from the data field.

17. A non-transitory computer-readable storage medium storing computer executable instructions that when executed by a processor cause the processor to perform the steps of:
monitoring a local procedure call interface of a monitored computing device;
identifying, based at least in part on the monitoring, a remote procedure call (RPC) of a suspicious process, the RPC being transmitted over a local procedure call message of the local procedure call interface;

identifying interface information in a code component associated with the RPC based at least in part on identifying the RPC;

constructing a protocol dissector in real-time based at least in part on the interface information;

analyzing, in conjunction with the protocol dissector, the RPC of the suspicious process;

identifying a data field of the RPC based at least in part on the analyzing;

using the interface information to decode data from the data field, wherein the interface information includes information regarding a serialization format, wherein decoding the data includes using the information regarding the serialization format to deserialize the data from the data field; and performing a security action based at least in part on the data from the data field.

* * * * *